United States Patent
Kim et al.

(10) Patent No.: US 7,499,389 B2
(45) Date of Patent: Mar. 3, 2009

(54) SUPER RESOLUTION INFORMATION STORAGE MEDIUM AND METHOD OF RECORDING DATA THEREON

(75) Inventors: Hyun-ki Kim, Hwaseong-si (KR); Joo-ho Kim, Yongin-si (KR); In-oh Hwang, Seongnam-si (KR); Du-seop Yoon, Seongnam-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 663 days.

(21) Appl. No.: 11/008,205

(22) Filed: Dec. 10, 2004

(65) Prior Publication Data

US 2005/0128931 A1 Jun. 16, 2005

(30) Foreign Application Priority Data

Dec. 12, 2003 (KR) .................. 10-2003-0090565

(51) Int. Cl.
*G11B 7/24* (2006.01)
(52) U.S. Cl. .................................................. 369/275.4
(58) Field of Classification Search ............. 369/275.4, 369/13.54, 13.55
See application file for complete search history.

(56) References Cited

U.S. PATENT DOCUMENTS

| | | | | |
|---|---|---|---|---|
| 5,537,381 | A * | 7/1996 | Fuji | 369/13.27 |
| 5,617,400 | A * | 4/1997 | Fuji | 369/13.54 |
| 6,288,992 | B1 * | 9/2001 | Okumura et al. | 369/47.5 |
| 6,741,527 | B2 * | 5/2004 | Okumura et al. | 369/13.26 |
| 2005/0117507 | A1 * | 6/2005 | Hwang et al. | 369/275.4 |
| 2007/0140087 | A1 * | 6/2007 | Fukuzawa et al. | 369/59.11 |
| 2007/0243417 | A1 * | 10/2007 | Murakami et al. | 369/13.56 |

FOREIGN PATENT DOCUMENTS

| | | |
|---|---|---|
| JP | 8-63817 | 3/1996 |
| JP | 10-241221 | 9/1998 |
| KR | 2000-71803 | 11/2000 |

OTHER PUBLICATIONS

International Search Report issued on Mar. 24, 2005, in International Application No. PCT/KR2004/003187.
Written Opinion of the International Searching Authority issued on Mar. 24, 2005, in International Application No. PCT/KR2004/003187.
J. Tominaga et al., "The Principle of Super-RENS and the Progress," *Technical Report of IEICE*, CPM99-82, Sep. 1999, pp. 21-25 (in Japanese with English Abstract).
J. Kim et al., "Super-resolution by elliptical bubble formation with $PtO_x$ and AgInSbTe layers," *Applied Physics Letters*, vol. 83, No. 9, Sep. 1, 2003, pp. 1701-1703 (in English).

* cited by examiner

*Primary Examiner*—Tan X Dinh
(74) *Attorney, Agent, or Firm*—Stein, McEwen, Bui, LLP

(57) ABSTRACT

A super resolution information storage medium capable of reproducing information recorded thereon as a mark with a size less than the resolution limit of an incident light beam, includes marks of varying sizes recorded thereon, excluding marks with a size in the vicinity of the resolution limit, where the resolution limit depends on the wavelength of a light source irradiating light on the information storage medium and the numerical aperture of an object lens focusing the light irradiated from the light source on the information storage medium. By adjusting the size of or excluding a mark with a size in the vicinity of the limit of the resolution that has a low C/N ratio, the C/N ratio is improved and the performance of super resolution information reproduction is improved such that high density and high capacity information storage medium can be implemented.

8 Claims, 4 Drawing Sheets

SUPER RESOLUTION INFORMATION STORAGE MEDIUM AND METHOD OF RECORDING DATA THEREON

CROSS-REFERENCE TO RELATED APPLICATIONS

This application claims the priority of Korean Patent Application No. 2003-90565, filed on Dec. 12, 2003 in the Korean Intellectual Property Office, the disclosure of which is incorporated herein in its entirety by reference.

BACKGROUND OF THE INVENTION

1. Field of the Invention

The present invention relates to an information storage medium capable of reproducing information recorded thereon as a mark with a size less than the resolution limit of a reproduction beam and having an improved carrier-to-noise (C/N) ratio, a C/N improving method and a data recording and/or reproducing apparatus.

2. Description of the Related Art

An optical recording medium is used as an information storage medium used in an optical pickup apparatus which performs recording and reproducing information contactlessly. With the ongoing industrial development, a higher recording density of information is desirable. For this, an optical recording medium capable of using a super resolution phenomenon in which the medium has a recording mark with a size less than the resolution limit of a laser beam is under development.

Information storage media are classified into reproduction dedicated storage media (read only memory, ROM) only for reproducing recorded information, write-once-read-many storage media capable of recording data only once, and rewritable storage media capable of recording, deleting, and rewriting data.

One of the most important characteristics of the information storage media is the storage capacity. The increase in the capacity of a storage medium depends on how small a mark can be recorded in a predetermined area of a storage medium, and how accurately the recorded mark can be reproduced.

In particular, the information reproduction performance depends on shortening the wavelength of a light source used in reproducing information, or increasing the numerical aperture of an object lens. However, with conventional technologies, there is a limit in providing a laser having a short wavelength, and in order to manufacture an object lens with a high numerical aperture, there is a limit in that the manufacturing cost is very expensive. In addition, as the numerical aperture of an object lens increases, the working distance between an optical pickup and a storage medium decreases and the possibility that information recorded on the storage medium is damaged by a clash between the optical pickup and the storage medium increases. For these and/or other reasons, it is not easy to implement a high capacity and high density storage medium.

Furthermore, when the wavelength of a light source to reproduce information on a storage medium is $\lambda$ and the numerical aperture of an object lens is NA, the minimum value of the reproduction resolution is $\lambda/4NA$. Accordingly, though it is possible to form a recording mark with an extremely small size, the reproduction can be impossible. That is, since the light irradiated from the light source cannot distinguish a recording mark with a size less than $\lambda/4NA$, it is generally impossible to reproduce the information.

Meanwhile, there is a super resolution phenomenon in which a recording mark with a size less than the limit of resolution power is reproduced, and the analysis and research and development of this super resolution phenomenon are briskly proceeding. According to the super resolution phenomenon, reproduction of a recording mark with a size less than the resolution limit is also possible such that the super resolution recording medium can dramatically satisfy the demands for the high density and high capacity.

There are a variety of basic recording characteristics and reproducing characteristics. Among them, the most important thing is to secure a good carrier-to-noise ratio (hereinafter, referred to as 'C/N').

In particular, since a super resolution information storage medium uses a recording beam and reproducing beam with a power relatively higher than that of an ordinary information storage medium, the improvement of the C/N ratio becomes very important.

SUMMARY OF THE INVENTION

In accordance with an aspect of the present invention, an information storage medium having a C/N ratio that allows reproduction of a mark with a size less than the resolution limit, and a method of and apparatus improving a C/N ratio are provided.

According to an aspect of the present invention, there is provided an information storage medium capable of reproducing information recorded thereon as a mark with a size less than the resolution limit of an incident light beam, wherein the information storage medium contains marks recorded thereon, excluding marks with a size in the vicinity of the limit of the resolution that depends on the wavelength of a light source irradiating light on the information storage medium, and the numerical aperture of an object lens focusing the light irradiated from the light source on the information storage medium.

In an aspect of the present invention, the size of the excluded marks have a range in which a carrier-to-noise ratio with respect to the size of a mark at a predetermined wavelength of the light source and a predetermined numerical aperture of the object lens appears relatively low.

In an aspect of the present invention, when the length of the mark is nT (n is a real number) and the size of the mark where the C/N is relatively low is mT (m is a real number), the mark with the size of mT is adjusted not to have a size in the vicinity of the resolution limit.

According to another aspect of the present invention, there is provided a method of recording data on an information storage medium capable of reproducing information recorded thereon as a mark with a size less than the resolution limit of an incident light beam, the method including: forming a mark on the information storage medium, excluding a mark with a size in the vicinity of the limit of the resolution that depends on the wavelength of a light source irradiating light on the information storage medium, and the numerical aperture of an object lens focusing the light irradiated from the light source on the information storage medium.

In an aspect of the present invention, when the length of the mark is nT (n is a real number) and the size of the mark where the C/N is relatively low is mT (m is a real number), only the mark with the size of mT is adjusted to be pT with a size out of a range in which the C/N appears relatively low.

In an aspect of the present invention, when the length of the mark is nT (n is a real number) and the size of the mark where the C/N appears relatively low is mT (m is a real number), the method includes: adjusting the mark with the size of mT to be mT' with a size out of a range in which the C/N is relatively low; and adjusting nT to be nT' according to T' obtained by adjusting mT.

In an aspect of the present invention, when the length of the mark is nT (n is a real number) and the size of the mark where the C/N is relatively low is mT (m is a real number), the method includes: adjusting the mark with the size of mT to be smaller or bigger by 'p' such that the mark has a size out of a range in which the C/N is relatively low; and adjusting nT to be smaller or bigger by 'p'.

According to another aspect of the present invention, there is provided an apparatus recording data on and/or reproducing data from a super resolution information storage medium capable of reproducing information recorded thereon as a mark with a size less than the resolution limit of an incident light beam, the apparatus including: a pickup unit which irradiates a beam on the information storage medium; a recording/reproducing signal processing unit which receives a beam reflected on the information storage medium through the pickup unit and performs signal processing; and a control unit which controls the pickup unit such that a mark, excluding a mark with a size in the vicinity of the limit of the resolution that depends on the wavelength of a light source irradiating light on the information storage medium, and the numerical aperture of an object lens focusing the light irradiated from the light source on the information storage medium, is formed on the information storage medium.

Additional aspects and/or advantages of the invention will be set forth in part in the description which follows and, in part, will be obvious from the description, or may be learned by practice of the invention.

BRIEF DESCRIPTION OF THE DRAWINGS

These and/or other aspects and advantages of the invention will become apparent and more readily appreciated from the following description of the embodiments, taken in conjunction with the accompanying drawings of which.

DETAILED DESCRIPTION OF THE EMBODIMENTS

Figure 1:
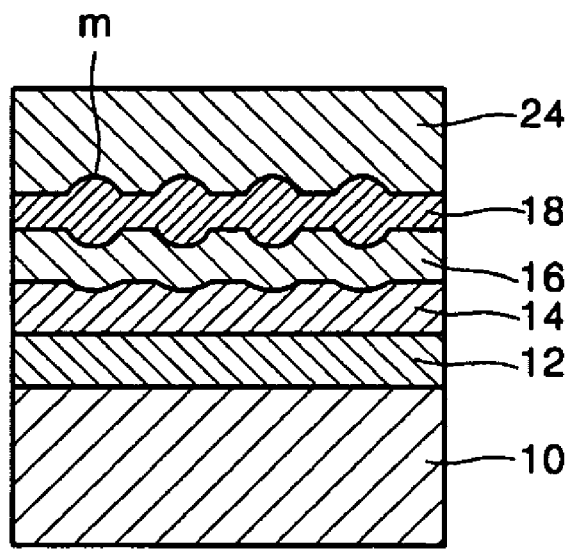
FIG. 1 is a diagram of an example of an information storage medium to which a C/N ratio improvement method according to an embodiment of the present invention is applied.

Reference will now be made in detail to the embodiments of the present invention, examples of which are illustrated in the accompanying drawings, wherein like reference numerals refer to the like elements throughout. The embodiments are described below to explain the present invention by referring to the figures.

An information storage medium according to aspects of the present invention is a super resolution information storage medium designed to be capable of reproducing information recorded as a mark with a size less than the limit of a resolution power. In particular, it is characterized in that by optimizing the size of a mark less than the resolution limit, the C/N ratio thereof is enhanced.

Referring to FIG. 1, an information storage medium, to which a C/N ratio improvement method according to an embodiment of the present invention is applied, includes a substrate 10, at least one super resolution layer 18 in which a thermal reaction occurs by irradiation of a reproduction beam to cause a super resolution phenomenon, and at least one heat absorption layer 14 which absorbs the heat of the reproduction beam to cause a super resolution phenomenon together with the super resolution layer 18.

The information storage medium may further include a first dielectric layer 12 between the substrate 10 and the heat absorption layer 14, a second dielectric layer 16 between the heat absorption layer 14 and the super resolution layer 18, and a third dielectric layer 24 on the super resolution layer 18.

The substrate 10 is formed with any one material selected among polycarbonate, polymethylmethacrylate (PMMA), amorphous polyolefine (AP) or glass.

The super resolution layer 18 can be formed with a metal oxide or a high molecular compound. For example, preferably, the super resolution layer 18 is formed with at least one metal oxide selected among the group of PtOx, PdOx, AuOx, or AgOx. Also, as a high molecular compound, such as $C_{32}H_{18}N_8$, or $H_2PC$ (Phthalocyanine) can be used. In the super resolution layer 18, a thermal reaction occurs due to a reproduction beam such that a super resolution phenomenon occurs.

When the thermal reaction occurs in the super resolution layer 18 due to the reproduction beam, the heat absorption layer 14 supports the super resolution layer 18 such that reproduction of a mark m with a size less than the resolution limit is enabled. The heat absorption layer 14 can be formed with either a Ge—Sb—Te alloy or an Ag—In—Sb—Te alloy.

Meanwhile, a reproduction beam can be irradiated from below the substrate 10 toward the substrate 10, or from the other side of the substrate 10.

Though the heat absorption layer 14 can be disposed above or below the super resolution layer 18, it is desirable that the heat absorption layer 14 is disposed closer to a side from which a reproduction beam is irradiated.

That is, when a reproduction beam is irradiated from a side of the medium opposite to the side of the substrate 10, the heat absorption layer 14 can be disposed on the super resolution layer 18, and when a reproduction beam is irradiated from below the substrate 10, it can be disposed below the super resolution layer 18. A cover layer (not shown) is further disposed when the beam is irradiated from the side opposite to the substrate 10.

Figure 2:
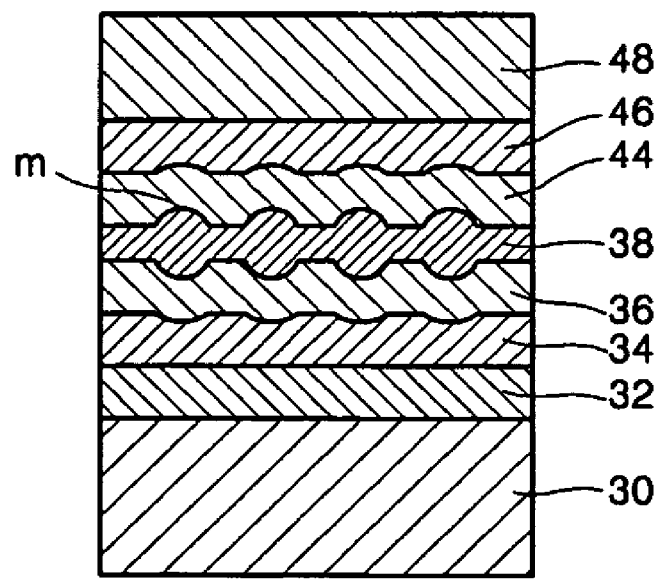
FIG. 2 is a diagram of another example of an information storage medium to which a C/N ratio improvement method according to an embodiment of the present invention is applied.

FIG. 2 is a diagram of an information storage medium having dual layers of heat absorption layers. This information storage medium has a structure in which a substrate 30 is disposed and a first heat absorption layer 34, a super resolution layer 38, and a second heat absorption layer 46 are disposed over the substrate 30.

Also, the information storage medium has a first dielectric layer 32 between the substrate 30 and the first heat absorption layer 34, a second dielectric layer 36 between the first heat absorption layer 34 and the super resolution layer 38, a third dielectric layer 44 between the super resolution layer 38 and the second heat absorption layer 46, and a fourth dielectric layer 48 on the second heat absorption layer 40.

The case where two heat absorption layers 34 and 46 are thus disposed has a better reproduction signal characteristic than that of a case where one heat absorption layer is disposed.

A process of data reproduction on the information storage medium illustrated in FIGS. 1 and 2 will now be explained. If a reproduction beam is irradiated on the information storage medium in order to reproduce data, a plasmon with a wavelength shorter than that of the launch beam is generated and excited from a metal particle on the part of the super resolution layer 18 and 38 on which the reproduction beam is incident, such that reproduction of a mark m with a size less than the resolution limit becomes possible. At this time, the corresponding heat absorption layers 14, 34, and 46 absorb heat of the reproduction beam and can affect the super resolution layers 18 and 38.

In a super resolution information storage medium, in order to enable reproduction of a mark with a size less than the resolution limit, a thermal reaction between the super resolution layers 18 and 38 and the corresponding heat absorption layers 14, 34, and 46 is induced. For this, a reproduction beam with a power relatively higher than that of a beam used for data reproduction in an ordinary information storage medium is used. Here, the ordinary information storage medium refers to an information storage medium in which data is reproduced not by the super resolution phenomenon, but by an ordinary method.

Since the power of the reproduction beam used in the super resolution information storage medium is high, it is expected that a possibility that a reproduction characteristic is degraded by repetitive irradiation of the reproduction beam is higher in the super resolution information storage medium than in an ordinary information storage medium. If the reproduction characteristic is thus degraded, further reproduction ultimately becomes impossible. Accordingly, prevention of degradation of the reproduction characteristic by repetitive reproduction is needed.

However, data reproduction becomes possible only when an appropriate C/N ratio is secured.

In order to improve the C/N ratio, a C/N ratio change with respect to the length of a mark of a super resolution information storage medium was measured.

Figure 3:
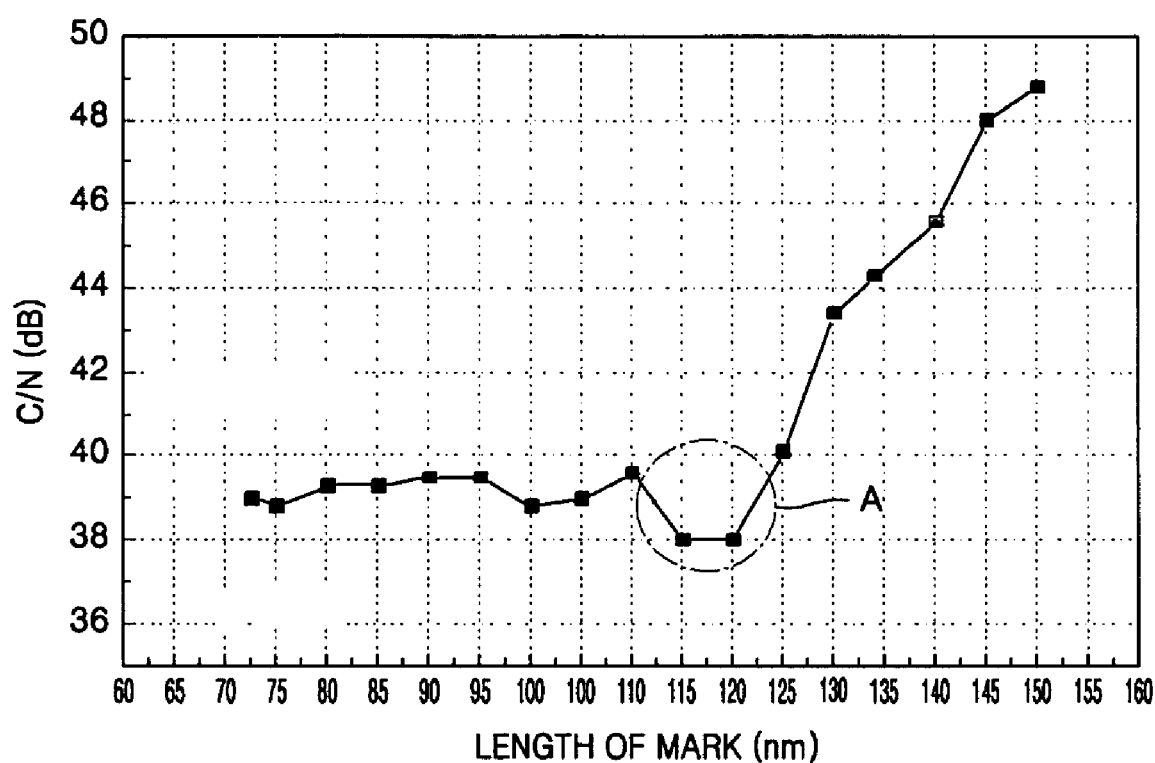
FIG. 3 is a graph showing a change in the C/N ratio with respect to the length of a mark when the numerical aperture (NA) of an object lens is 0.85 and the wavelength of a laser light source is 405 nm.

FIG. 3 is a graph showing the result of measuring a change in the C/N ratio, which was measured by changing the length of a mark when the wavelength of a laser light source used to reproduce information recorded on the information storage medium is 405 nm and the numerical aperture (NA) of an object lens is 0.85.

Figure 4:
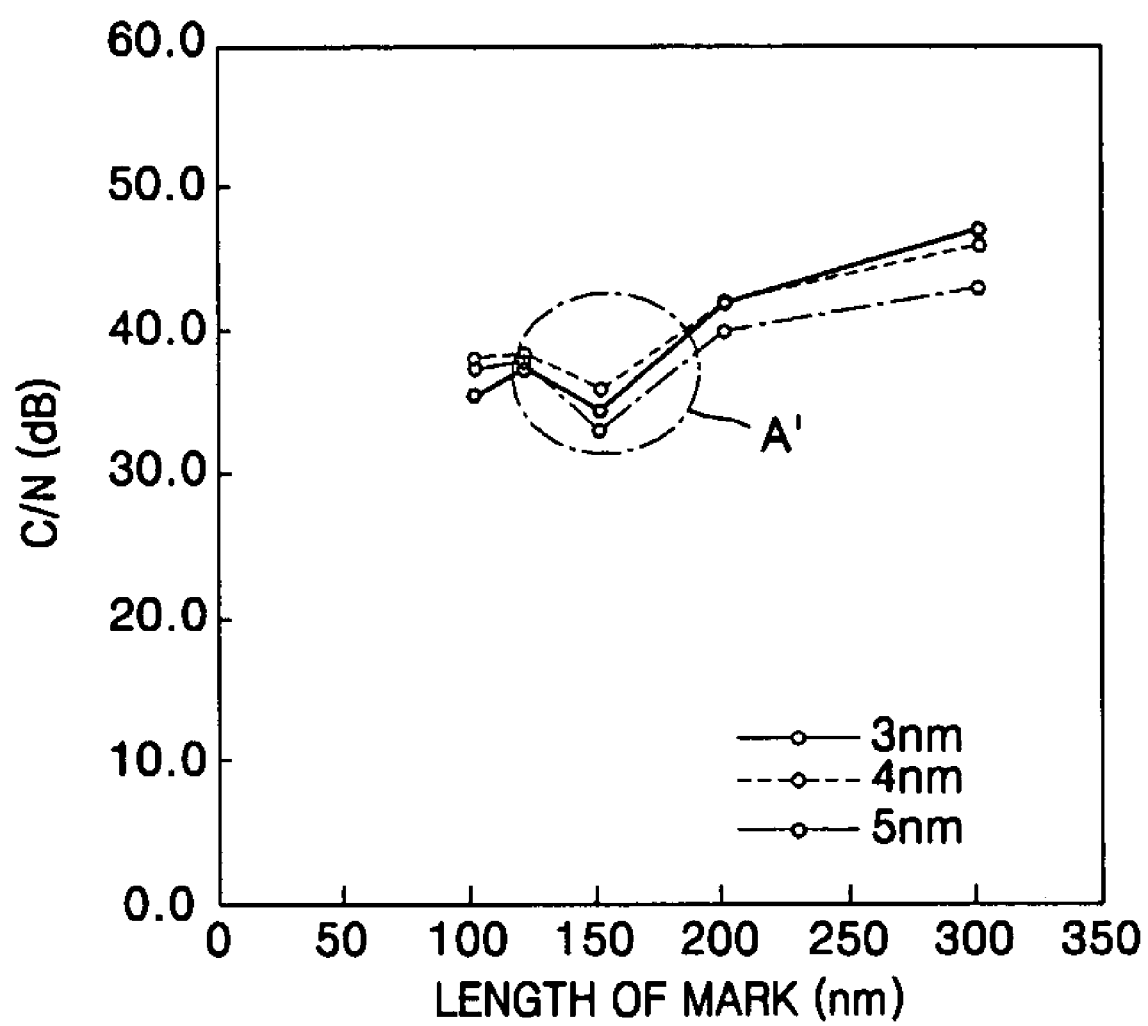
FIG. 4 is a graph showing a change in the C/N ratio with respect to the length of a mark when the NA of an object lens is 0.65 and the wavelength of a laser light source is 405 nm.

FIG. 4 is a graph showing a change in the C/N ratio with respect to the length of a mark when the NA of an object lens is 0.65 and the wavelength of a laser light source is 405 nm.

According to the results of FIGS. 3 and 4, the C/N ratio is seen to rapidly degrade in an interval (A, A'), respectively, having a predetermined mark length. Here, assuming that the wavelength of the laser light source is $\lambda$ and the numerical aperture of an object lens is NA, the resolution is $\lambda/4NA$. For example, when the wavelength is 405 nm and the numerical aperture is 0.85, the resolution is approximately 119.11 nm. Also, when the wavelength is 405 nm and the numerical aperture is 0.65, the resolution is approximately 155.7 nm. A mark with a size less than the resolution limit cannot be reproduced by an ordinary method. However, by using the super resolution phenomenon, this mark with a size less than the resolution limit can be reproduced.

Meanwhile, according to the result of the C/N ratio with respect to the length of a mark, it can be confirmed that the C/N ratio changes rapidly in relation to a mark in an interval (A, A') having a length close to the resolution limit.

The graph shows that the C/N ratio changes in the vicinity of the resolution limit relatively rapidly such that the C/N ratio in the vicinity of the resolution limit appeared lower than even the C/N ratio of a mark having a length shorter than the resolution limit.

Considering the result, it is desirable that a mark to be recorded on an information storage medium does not have a length in the vicinity of the resolution limit. Thus, by excluding a mark of a length in the vicinity of the resolution limit, occurrence of the case where the C/N ratio is relatively low can be prevented.

In other words, when the length of a mark formed on an information storage medium is nT (n is a real number) and at least one of these marks has a size in the vicinity of the resolution limit where the C/N ratio is relatively low, these marks are adjusted not to have the size in the vicinity such that marks of a size where the C/N is low are excluded.

More specifically, when the minimum mark length (MML) of a mark is nT (n is a real number) and the information storage medium includes marks having sizes of nT, (n+1)T, . . . , (n+m)T, and one of the marks, pT, has a size in the vicinity of the resolution limit, pT is adjusted to have a size away from the vicinity of the resolution limit. The extent that pT is adjusted to have a size away from the vicinity of the resolution limit is determined by the range in which the C/N ratio is relatively lower than those of other marks having different sizes.

In order to optimize the size of a mark considering the results of FIGS. 3 and 4, assuming that mT denotes a mark with a size in the vicinity of the resolution limit, mT satisfies the following condition expression 1:

$$\frac{\lambda}{4NA} - 8(\text{nm}) \geq mT \text{ or } \frac{\lambda}{4NA} + 5(\text{nm}) \leq mT \quad (1)$$

where, m denotes a real number.

For example, when the wavelength ($\lambda$) of a laser light source is 405 nm, the numerical aperture is 0.85, and the minimum mark length is 2T=75 nm, the resolution is approximately 119.11 nm. In this case, since the C/N for a mark in area A as shown in FIG. 3 appears relatively low, it is preferable that a mark does not have a size in this range. For example, when 2T=75 nm, 3T is 112.5 nm and with this size, the C/N ratio is low. Accordingly, a mark with a size away from the interval (A, A') in the vicinity of the resolution limit is formed instead of 3T=112.5 nm. The expression 1 can be applied as the following expression 2:

$$111.1 \text{ (nm)} \geq 3T \text{ or } 124.11 \text{ (nm)} \leq 3T \quad (2)$$

By adjusting 3T to have a length in the range of the equation 2, the remaining marks having other lengths, 4T, 5T, 6T, 7T, . . . , can have lengths determined based on T that is determined by the minimum mark length, that is, 2T=75 (nm). In other words, a mark with a length in the range obtained according to the expression 2, instead of being equal to 3T, is formed and the remaining marks are formed to have lengths of 4T=150 (nm), 5T=187.5 (nm), 6T=225 (nm), and so on. Thus, pT having a value close to the resolution limit is adjusted not to have a value in the vicinity of the resolution limit, and marks having the remaining other lengths are made to have lengths based on T that are determined by the minimum mark length nT.

As a result, only a mark corresponding to an interval having a size in the vicinity of the resolution limit, in which the C/N appears relatively low, is adjusted to have a size away from the interval, and for the remaining mark sizes, the sizes are determined as a multiple of the minimum mark length without change.

Also, in another aspect of the present invention, a mark with a length pT in the vicinity of the resolution limit is adjusted to become pT' such that it has a size away from the interval where the C/N ratio is relatively low, and according to the adjusted pT', all the sizes of marks having the remaining other lengths can be adjusted.

More specifically, in the above example, based on T' obtained by adjusting 3T having a size in the vicinity of the resolution limit, the sizes of the remaining marks can be adjusted. For example, assuming that 3T'=107 nm, marks having sizes of 2T', 4T', 5T', . . . , based on T'=107/3 are formed.

In another aspect of the present invention, a mark with a size in the vicinity of the resolution limit can be adjusted to be smaller or bigger to the extent that the size gets out of the vicinity of the resolution limit. That is, assuming that a mark has a size in the vicinity of the resolution limit and the size is pT, and the size adjustment necessary to move the size out of the vicinity of the resolution limit is Q, size pT is adjusted to have a size of (pT+Q) or (pT−Q). Also, in the same manner, the remaining marks having sizes that are adjusted to be smaller or bigger by the amount Q are formed.

Referring to FIG. 4, in another example, when the NA is 0.65 and the wavelength is 405 nm, the resolution is 155.7 nm. Here, when the minimum mark length is 2T=150 nm, this minimum mark length has a value in the vicinity of the resolution limit, thus 2T is adjusted not to have a value in the vicinity of the resolution value. For example, 2T is adjusted to satisfy expression 1 and marks having other lengths, that is, 3T, 4T, 5T, . . . , nT, are adjusted to have lengths determined based on T that is determined by 2T=150 nm.

Also, in another aspect of the present invention, the size of marks are set according to T' determined by adjusting 2T, and the remaining marks of sizes 3T', 4T', 5T', . . . , nT' can be adjusted.

Next, only marks with sizes in the vicinity of the resolution limit among marks with lengths varying from 2T~8T need to be adjusted not to have a size in the vicinity of the resolution limit.

At this time, by making a new mark that is obtained by adjusting a mark with a size in the vicinity of the resolution limit, recognized as an existing mark, the existing signal processing system can be used without change.

A method of recording data on and/or reproducing data from an information storage medium according to an embodiment of the present invention includes recording information in order not to have a mark with a size in the vicinity of the resolution limit.

Assuming that a mark has a size of nT (n is a real number), if there is a mark with a size in the vicinity of the resolution limit among the marks, the size of the mark is adjusted not to have an adjusted size in the vicinity of the resolution limit.

In order for a mark not to have a size in the vicinity of the resolution limit, among marks with a size of nT, only the size of a mark in the vicinity of the resolution limit is changed. For example, when marks with sizes of 2T~8T are recorded on an information storage medium and 3T is a size in the vicinity of the resolution limit of the reproducing apparatus of the information storage medium, only the mark with the length of 3T is adjusted to not have a length in the vicinity of the resolution limit and marks with the remaining lengths (i.e., 2T, 4T, 5T, 6T, 7T, and 8T) maintain the lengths determined by T.

Also, in another aspect of the present invention, when 3T is a size in the vicinity of the resolution limit, the size of a minimum mark length is adjusted and according to T' based on the adjusted minimum mark length, the lengths of 2T~8T may be newly determined. In other words, when marks have sizes of 2T~8T and the minimum mark length is 2T, 2T is adjusted to be 2T' and based on the adjusted T', marks are adjusted to have sizes of 2T'~8T' such that the sizes of 2T'~8T' are not in the vicinity of the resolution limit. Here, the adjusted T' in the minimum mark length is selected in order that a mark with a size in the vicinity of the resolution limit is not included in the vicinity of the resolution limit. In this case, all marks have lengths adjusted according to the newly adjusted T'.

In another aspect of the present invention, when there is a mark with a size in the vicinity of the resolution limit among marks each with a size of nT, the size of the mark in the vicinity of the resolution limit is adjusted so that the C/N ratio is not in a bad range, and the remaining lengths of other marks are adjusted by the same amount. For example, when a mark has a size of 2T~8T and 3T is a size in the vicinity of the resolution limit, the size of 3T can be adjusted to be smaller or bigger by an amount 'a' in order for 3T not to have a size in the vicinity of the resolution limit. Also, the lengths of the other marks are also adjusted to be smaller or bigger by the same amount 'a'.

Thus, by excluding a mark with a size in the vicinity of the resolution limit in which the C/N ratio is relatively low, it can be made that the overall C/N ratio can be made high.

Figure 5:
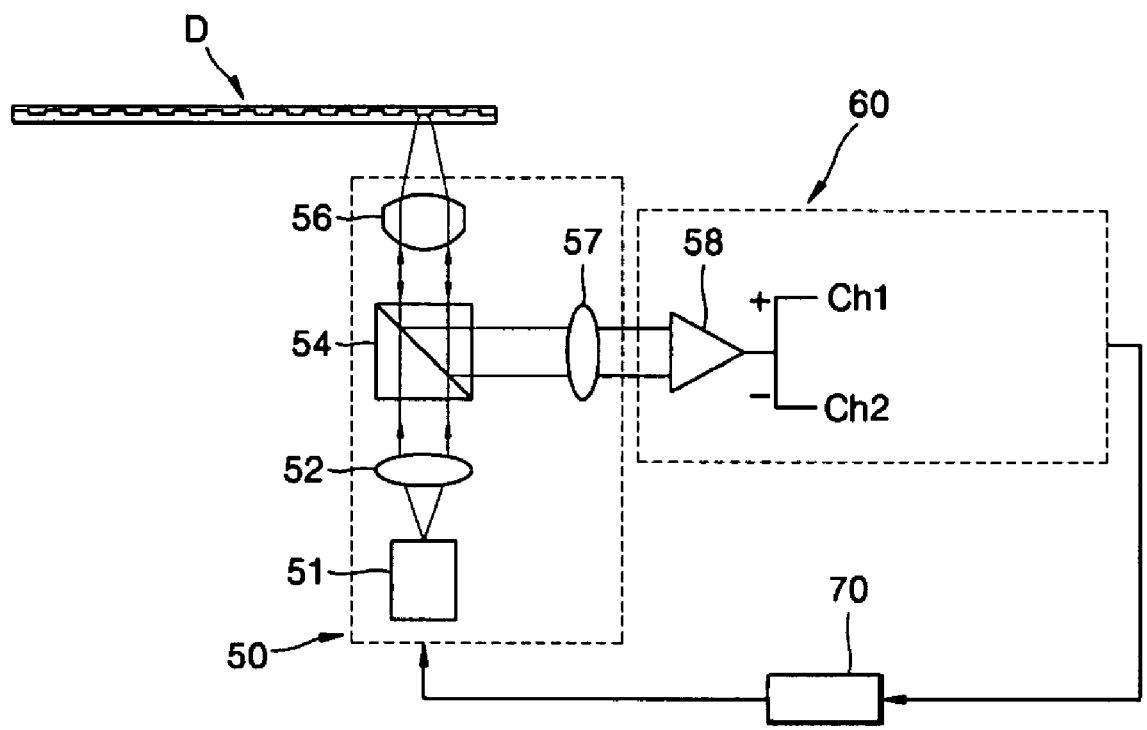
FIG. 5 is a schematic diagram of a system recording data on and/or reproducing data from the information storage medium according to an embodiment of the present invention.

FIG. 5 is a schematic diagram of a system recording data on and/or reproducing data from the information storage medium according to an embodiment of the present invention. The recording and/or reproducing apparatus includes a pickup unit 50, a recording/reproducing signal processing unit 60, and a control unit 70. More specifically, the recording and/or reproducing system includes a laser diode 51 irradiating light, a collimating lens 52 collimating the light irradiated by the laser diode 51, a beam splitter 54 changing the traveling path of an incident light beam, and an object lens 56 focusing the light beam passing through the beam splitter 54 on the information storage medium (D).

When a mark is recorded on the information storage medium (D), the mark is made not to have a size or length in the vicinity of the resolution limit. In particular, there is formed a mark not having a length in the vicinity of the resolution limit where the C/N ratio with respect to the length of the mark is relatively low.

A light beam which is reflected on the information storage medium (D) on which the mark is formed not to have a size in the vicinity of the resolution limit, is reflected by the beam splitter 54 and then, is received by a photo detector, for example, a quad-detector 57. The light received by the photo detector 57 is converted into an electric signal while passing through the operational circuit unit 58, which outputs the received light as an RF signal, that is, channel 1 (Ch1), which is detected as a sum of signals, and a differential signal channel (Ch2), which is detected based on a push-pull method.

The control unit 70 performs control such that a reproduction beam with a power higher than a predetermined power required according to the material characteristic of the information storage medium is irradiated through the pickup unit 50. If the reproduction beam is applied to the information storage medium (D) through the pickup unit 50, a super resolution phenomenon occurs in the information storage medium (D). Since the super resolution phenomenon in the information storage medium according to aspects of the present invention is as described above, a detailed explanation will be omitted here.

The beam reflected by the information storage medium (D) is input to the photo detector 57 through the object lens 56 and the beam splitter 54. The signal input to the photo detector 57 is converted into an electric signal by the operational circuit unit 58 and output as an RF signal. By using the C/N characteristic with respect to the length of a mark, the information storage medium (D) stores information with marks, excluding marks with sizes having relatively low C/N ratio. By doing so, the information storage medium (D) can make all marks formed thereon have good C/N ratios regardless of size. Accordingly, recording and/or reproducing data can be smoothly performed by the signal processing unit 60 and the control unit 70.

As described above, the information storage medium according to aspects of the present invention is a super resolution information storage medium capable of reproducing information recorded as a mark with a size less than the resolution limit.

In particular, when a mark with a size in the vicinity of the resolution limit is formed, by using the characteristic that the mark has a C/N ratio relatively lower than those of other marks with different sizes, the mark is formed not to have a size in the vicinity of the resolution limit where the C/N ratio is relatively low. By doing so, the C/N ratio of each mark formed on the information storage medium is made to appear high, and accordingly, the performance of reproducing information by using the super resolution phenomenon is improved. Thus, by enabling the implementation of a super resolution information storage medium, high density and high capacity of an information storage medium can be realized.

Also, by optimally determining the size of a mark formed on an information storage medium, the information recording and/or reproducing method according to the present invention makes the C/N ratio be high in all marks such that a method by which information recorded on the information storage medium can be reproduced correctly by using super resolution is provided.

The information storage media according to the above embodiments of the present invention are explained as a multilayer film structure, with 5 layers or 7 layers, built on a substrate, and the super resolution layer is expressed as being formed of predetermined materials.

Although a few embodiments of the present invention have been shown and described, it would be appreciated by those skilled in the art that changes may be made in these embodiments without departing from the principles and spirit of the invention, the scope of which is defined in the claims and their equivalents.

What is claimed is:

1. An information storage medium capable of reproducing information recorded thereon as marks with a size less than a resolution limit of an incident light beam, wherein:
   the information storage medium contains a plurality of marks of various sizes recorded thereon, excluding marks with a size near the resolution limit,
   the resolution limit depends on a wavelength of a light source irradiating light on the information storage medium and a numerical aperture of an object lens focusing the light irradiated from the light source on the information storage medium, and
   when λ denotes the wavelength of the light source, NA denotes the numerical aperture of the object lens, and mT (where m is a real number) denotes at least one mark with a size in the vicinity of the resolution limit among the marks, mT has a size in the following range:

$$\frac{\lambda}{4NA} - 8(\text{nm}) \geq mT \text{ or } \frac{\lambda}{4NA} + 5(\text{nm}) \leq mT.$$

2. The information storage medium of claim 1, wherein the size of the excluded marks has a range in which a carrier-to-noise ratio (C/N) with respect to the size of a mark at a predetermined wavelength of the light source and a predetermined numerical aperture of the object lens is relatively low.

3. The information storage medium of claim 1, wherein when the length of the mark is nT (where n is a real number) and mT (where m is a real number) denotes a mark with a size in the vicinity of the resolution limit among the marks, the mark with the size of mT is adjusted not to have a size in the vicinity of the resolution limit.

4. A method of recording data on an information storage medium capable of reproducing information recorded thereon as a mark with a size less than a resolution limit of an incident light beam, the method comprising:
   forming marks having variable sizes on the information storage medium, excluding at least one mark with a size near the resolution limit, wherein:
   the resolution limit depends on a wavelength of a light source irradiating light on the information storage medium and a numerical aperture of an object lens focusing the light irradiated from the light source on the information storage medium, and
   when λ denotes the wavelength of the light source, NA denotes the numerical aperture of the object lens, and mT (where m is a real number) denotes a mark with a size in the vicinity of the resolution limit among the marks, mT has a size in the following range:

$$\frac{\lambda}{4NA} - 8(\text{nm}) \geq mT \text{ or } \frac{\lambda}{4NA} + 5(\text{nm}) \leq mT.$$

5. The method of claim 4, wherein the size of the at least one excluded mark has a range in which a carrier-to-noise (C/N) ratio with respect to the size of the mark at a predetermined wavelength of the light source and a predetermined numerical aperture of the object lens is relatively low.

6. The method of claim 4, wherein when the size of the mark is nT (where n is a real number) and the size of the at least one excluded mark where a carrier-to-noise (C/N) ratio is relatively low is mT (where m is a real number), only the at least one excluded mark with the size of mT is adjusted to be pT with a size out of a range in which the C/N ratio is relatively low.

7. The method of claim 4, wherein when the size of the mark is nT (where n is a real number) and the size of the at least one excluded mark where a carrier-to-noise (C/N) ratio is relatively low is mT (where m is a real number), the method further comprises:
   adjusting the at least one excluded mark with the size of mT to be mT' with a size out of a range in which the C/N is relatively low; and
   adjusting nT to be nT' according to T' obtained by adjusting mT to mT'.

8. The method of claim 4, wherein when the size of the mark is nT (where n is a real number) and the size of the at least one excluded mark where a carrier-to-noise (C/N) ratio is relatively low is mT (where m is a real number), the method further comprising:

adjusting the at least one mark with the size of mT to be smaller or larger by an amount 'p' such that the at least one mark has a size out of a range in which the C/N ratio is relatively low; and adjusting nT to be smaller or larger by the amount 'p'.

* * * * *